April 24, 1934. W. H. COOK 1,956,276
HOOF MOISTENER
Filed July 17, 1933
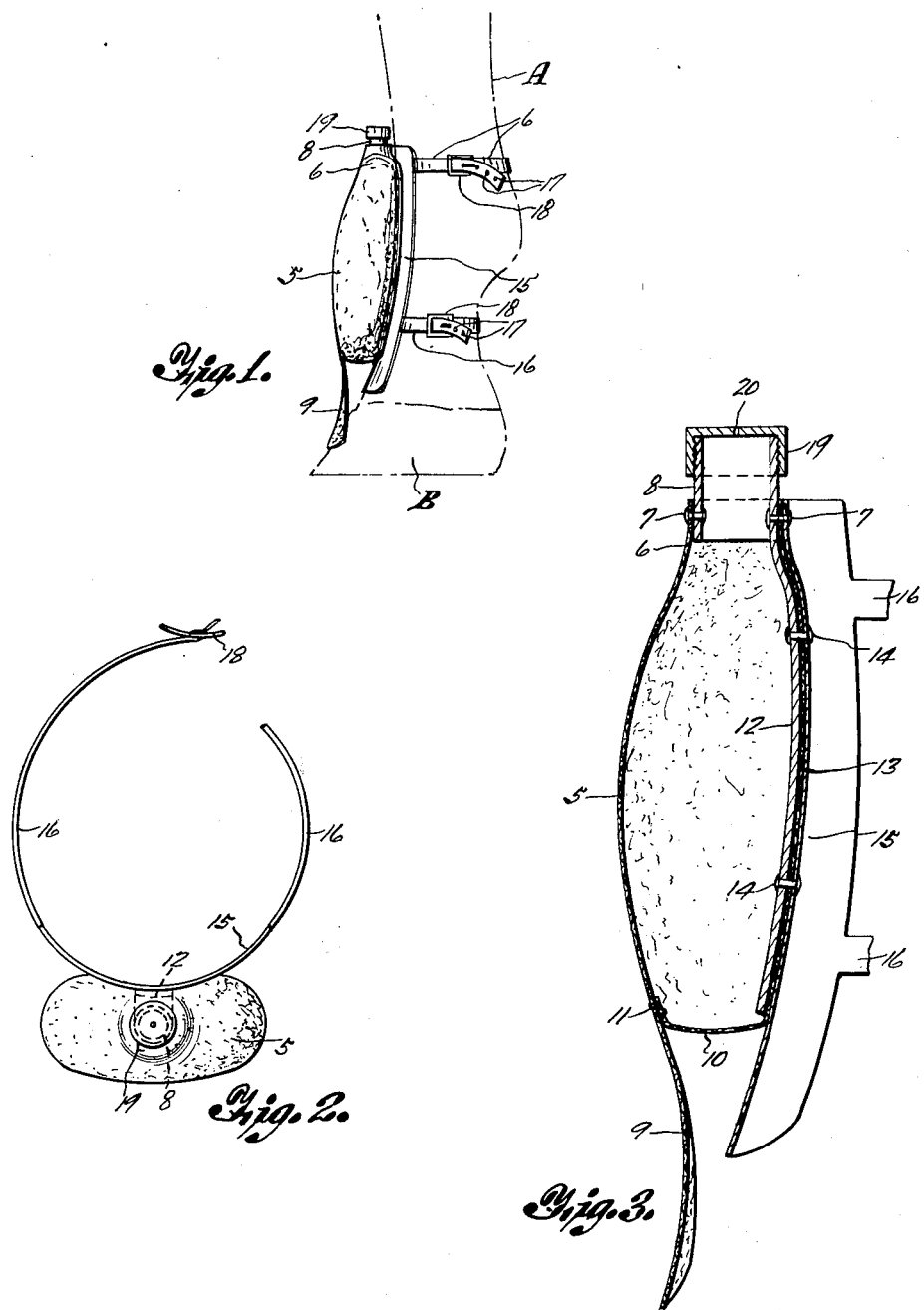
INVENTOR
WILDER H. COOK
By Adam E. Fisher
ATTORNEY Patented Apr. 24, 1934

1,956,276

UNITED STATES PATENT OFFICE 1,956,276

HOOF MOISTENER

Wilder H. Cook, Athens, N. Y.

Application July 17, 1933, Serial No. 680,804

1 Claim. (Cl. 128—260)

My invention relates to a moistening device for the hoofs of horses or other animals.

The main object of the invention is to provide a simple, efficient and convenient means for supplying moisture to the hoofs of horses and the like sufficient to keep the hoofs in a healthy condition and to prevent them from breaking or checking as they commonly do when too dry and brittle.

Another object is to provide a device of this nature including a water bag adapted to be strapped to the leg and having a felt flap or wick dropping down over the hoof by which water from the bag may seep down on the hoof, the leg above the hoof being protected from moisture by a waterproof backing and the bag as a whole being held in proper extended position by a rigid reinforcing rib.

With these and other objects in view the invention resides in the novel construction and arrangement of parts as hereinafter set forth and claimed, reference being had to the accompanying drawing wherein:

Figure 1 is a side view of the moistener as attached to a leg and hoof, the latter being shown in broken lines.

Figure 2 is an enlarged plan view of the moistener alone.

Figure 3 is an enlarged vertical cross section through the moistener alone.

Referring now with more particularity to the drawing my invention comprises a water bag designated generally at 5 made of a sleeve-like casing of felt or similar material drawn in at its neck 6 and secured in any suitable manner as by rivets 7 to a tubular metal neck 8. At its bottom the bag 5 has a depending flap or wick 9 extended from the front of the bag and the bottom is closed by a flap 10 extended from the back and sides of the bag and sewed or otherwise secured to the front at 11. The metal neck 8 has a downwardly extended rib or prong 12 extended from its intended rear side within the back 13 of the bag to which it is secured by suitable means such as rivets 14. A back piece or backing 15 of waterproof canvas or similar fabric is placed across the back of the bag 5 and is secured thereto by the rivets 7 and 14 or by sewing to the back 13, and fastening straps 16 are extended from the vertical margins of this back piece near its upper and lower extremities, the straps on one side being perforated at 17 to engage buckles 18 on the other straps. The back piece 15 extends below the bag 5 a substantial distance but does not extend to the bottom of the flap 9 as shown and for a purpose to be described. The metal neck 8 is exteriorly threaded around its mouth to receive a filler cap 19 which is provided at its center with an air vent 20.

In use the bag 5 is mounted by the straps 16 around the horse's leg A above the hoof B as shown in Figure 1, the bag being disposed preferably on the front of the leg, and the flap 9 then depends or lies down over the hoof a substantial distance. The bag is then filled with water which seeps slowly down through the felt and through the flap 9 to the hoof and keeps the same moist and in healthy condition. The back piece 15 protects the leg from the moisture and its downward extension below the bag serves this purpose clear down to the hoof. The bag and back as a whole are flexible and so will accommodate themselves to the curvature of the leg as shown in Figure 2 but the rib 12 will hold the bag in its proper vertical extended position and will prevent collapsing.

While I have herein set forth a certain preferred embodiment of my invention it is understood that I may vary from the same in minor structural details, so as best to construct a practical device for the purposes intended, not departing from the spirit of the invention and within the scope of the appended claim.

I claim:

In a device of the kind described, a felt bag, a downwardly extended hoof moistening flap on the bag, a metal neck secured in the top of the bag, a rigid rib extended downward from the neck and secured within the back of the bag, a filler cap threaded on the neck, a waterproof back piece attached to the back of the bag, and mounting straps mounted from the margins of the back piece.

WILDER H. COOK.